United States Patent
Sellers-Blais

(10) Patent No.: US 11,069,258 B2
(45) Date of Patent: Jul. 20, 2021

(54) SYSTEM FOR BEHAVIORAL CONDITIONING THROUGH GAMIFICATION

(71) Applicant: IFWIZARD Corporation, Coeur d'Alene, ID (US)

(72) Inventor: Dominic Samuel Sellers-Blais, Coeur d'Alene, ID (US)

(73) Assignee: IFWIZARD COPRPORATION, Coeur d'Alene, ID (US)

( * ) Notice: Subject to any disclaimer, the term of this patent is extended or adjusted under 35 U.S.C. 154(b) by 250 days.

(21) Appl. No.: 15/623,310

(22) Filed: Jun. 14, 2017

(65) Prior Publication Data

US 2018/0366028 A1    Dec. 20, 2018

(51) Int. Cl.
| G09B 19/22 | (2006.01) |
| G09B 23/28 | (2006.01) |
| G09B 5/00 | (2006.01) |
| A63F 13/45 | (2014.01) |
| A63F 13/57 | (2014.01) |
| A63F 13/80 | (2014.01) |
| A63F 13/79 | (2014.01) |
| A63F 13/35 | (2014.01) |

(52) U.S. Cl.
CPC .............. *G09B 19/22* (2013.01); *A63F 13/35* (2014.09); *A63F 13/45* (2014.09); *A63F 13/57* (2014.09); *A63F 13/79* (2014.09); *A63F 13/80* (2014.09); *G09B 5/00* (2013.01); *G09B 23/28* (2013.01)

(58) Field of Classification Search
CPC .......... G09B 19/00; G09B 23/28; G09B 5/00; G09B 19/22; A63F 13/45; A63F 13/57; A63F 13/79; A63F 13/80; A63F 13/67
See application file for complete search history.

(56) References Cited

U.S. PATENT DOCUMENTS

| | | | |
|---|---|---|---|
| 3,986,136 A * | 10/1976 | Hurlburt | A61B 5/16 331/78 |
| 9,302,179 B1* | 4/2016 | Merzenich | A63F 13/80 |
| 2003/0017439 A1* | 1/2003 | Rapoza | G09B 23/28 434/236 |
| 2003/0054326 A1* | 3/2003 | Aaron-Barrada | G09B 19/0076 434/236 |
| 2004/0029625 A1* | 2/2004 | Annunziata | A63F 13/10 463/1 |
| 2004/0030458 A1* | 2/2004 | Entenmann | G01C 21/3626 701/1 |

(Continued)

OTHER PUBLICATIONS

Wikipedia; "Operant Conditioning"; https://en.wikipedia.org/wiki/Operant_conditioning; retrieved Jun. 1, 2017; 11 Pages.

*Primary Examiner* — Jerry-Daryl Fletcher
(74) *Attorney, Agent, or Firm* — Micah D. Stolowitz; FisherBroyles LLP

(57) ABSTRACT

In an example, a system is disclosed for behavioral conditioning through games using a systematic process of cue deconstruction, reaction prompting, and the novel application of classical and operant conditioning techniques. The invention describes the design and production of specially configured clients with given conditioned and unconditioned stimuli for reinforcement and punishment, their provision through a server, and the collection of user metrics for behavioral profiling.

11 Claims, 12 Drawing Sheets

(56) References Cited

U.S. PATENT DOCUMENTS

| | | | | |
|---|---|---|---|---|
| 2004/0063081 A1* | 4/2004 | Lipkins | .................. | G09B 19/00 |
| | | | | 434/236 |
| 2005/0042586 A1* | 2/2005 | Carpenter | ............... | G09B 19/00 |
| | | | | 434/238 |
| 2009/0006295 A1* | 1/2009 | Angell | ................ | G06K 9/00335 |
| | | | | 706/21 |
| 2009/0069707 A1* | 3/2009 | Sandford | ............ | A61B 5/0482 |
| | | | | 600/545 |
| 2011/0223570 A1* | 9/2011 | Bellontine | .......... | A63F 3/00006 |
| | | | | 434/236 |
| 2011/0287396 A1* | 11/2011 | Gengler | ................. | G09B 19/00 |
| | | | | 434/236 |
| 2013/0118418 A1* | 5/2013 | Lalor | ................... | A01K 15/021 |
| | | | | 119/720 |
| 2014/0272847 A1* | 9/2014 | Grimes | ................. | G09B 19/00 |
| | | | | 434/236 |
| 2015/0065822 A1* | 3/2015 | Blenkush | ............. | A61B 5/4845 |
| | | | | 600/309 |
| 2015/0161906 A1* | 6/2015 | Lorkowski | ......... | G09B 19/0076 |
| | | | | 434/236 |
| 2018/0015373 A1* | 1/2018 | Greenberg | ............ | A63F 13/833 |

\* cited by examiner

SYSTEM FOR BEHAVIORAL CONDITIONING THROUGH GAMIFICATION

COPYRIGHT NOTICE

© 2017 IFWIZARD CORPORATION. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND OF THE INVENTION

Behaviorism has been scientifically shown to be highly effective in modifying the behavior of organisms through both classical and operant conditioning techniques. Behavioralist approaches have been well established for their efficacy in psychological treatment including Cognitive Behavioral Therapy (CBT), Dialectical Behavioral Therapy (DBT), and Motivational Interviewing (MI). The applications of these behaviorism-based methods include treatment of addiction, bias, and criminal rehabilitation. More broadly, behaviorist approaches are commonly employed in education, advertising, and politics due to their readily quantifiable effectiveness. In classical conditioning, the unconditioned stimulus (UCS) is one that unconditionally, naturally, and automatically triggers a response. For example, when you smell one of your favorite foods, you may immediately feel very hungry.

In either classical or operant conditioning, a stimulus may increase the probability that a particular behavior will occur. When this happens, the formerly neutral stimulus is called a conditioned reinforcer, as opposed to a naturally positive or negative reinforcer, such as food or an electric shock.

Games, especially electronic games, have become a major fixture of recreational life in industrialized countries with over 80% of households having an electronic gaming device. The use of games for education has been of considerable interest for many decades while the power of games to condition behavior has been the subject of considerable interest, alarm, and research, especially regarding education and aggressive behavior.

However, games, despite their inherit behavioral mechanisms far exceeding traditional media such as television and printed literature, have not been systematically exploited as means for deliberate behavioral conditioning nor have the extant methods of classical and operant conditioning been meaningfully adapted towards the use of games for modifying non-game behavior. This is largely due to social traditions and conventions which have regarded games as leisure recreations with little external application.

SUMMARY OF THE DISCLOSURE

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

Accordingly, it is an object of the present disclosure to provide a system, method, and data structures for the systematic application of gamification to behavioral conditioning overcoming the aforementioned problems and shortcomings of the prior art. It is a further object of the present invention to provide an adaptable mechanism for the configuration of the resulting game making it suitable for a range of user populations.

Another object of the present invention is to provide an adaptable game mechanism for the conditioning of a reinforcement criterion for given conditioned stimuli using any number of unconditioned stimuli, with the conditioned stimuli developed through deconstructed cues from external behavior. Such reinforcement criteria are used for reinforcing or encouraging specific behavior by the user of the system.

Another object of the present invention is to provide an adaptable game mechanism for the conditioning of a punishment criterion for given conditioned stimuli using any number of unconditioned stimuli, with the conditioned stimuli developed through deconstructed cues from external behavior. There punishment criteria are used for punishing or making aversive specific behavior by the user of the system.

A further object of the present invention is the generation of game clients that correctly encapsulate the desired settings for the behavioral conditioning game as configured through a designer tool, and the provision of these clients through a server.

Another object of the present invention is the recording of user metrics during behavioral conditioning training for purposes of inter-session analysis and optimization. These metrics may be further used for manual adjustment through the designer and the storing of the metrics as a user profile.

A further object of the present invention is the reapplication of the user game metrics from previous behavioral conditioning sessions which have formed a user profile to another, different user so that the existing behavior profile may be reproduced in the new user, allowing the criteria of conditioning to be reproduction of an existing user's behavior rather than an explicitly designed program of conditioning.

Additional aspects and advantages of this invention will be apparent from the following detailed description of preferred embodiments, which proceeds with reference to the accompanying drawings.

BRIEF DESCRIPTION OF THE DRAWINGS

In order to describe the manner in which the above-recited and other advantages and features of the disclosure can be obtained, a more particular description follows by reference to the specific embodiments thereof which are illustrated in the appended drawings. Although the preferred embodiment of the present invention is a computer program product, as will be appreciated by one skilled in the art, aspects of the present invention may be embodied as an entirely non-computerized or non-electronic embodiment. Understanding that these drawings therefore depict only typical embodiments of the invention and are not to be considered to be limiting of its scope, the invention will be described and explained with additional specificity and detail through the use of the accompanying drawings in which.

DETAILED DESCRIPTION OF PREFERRED EMBODIMENTS

Figure 1:
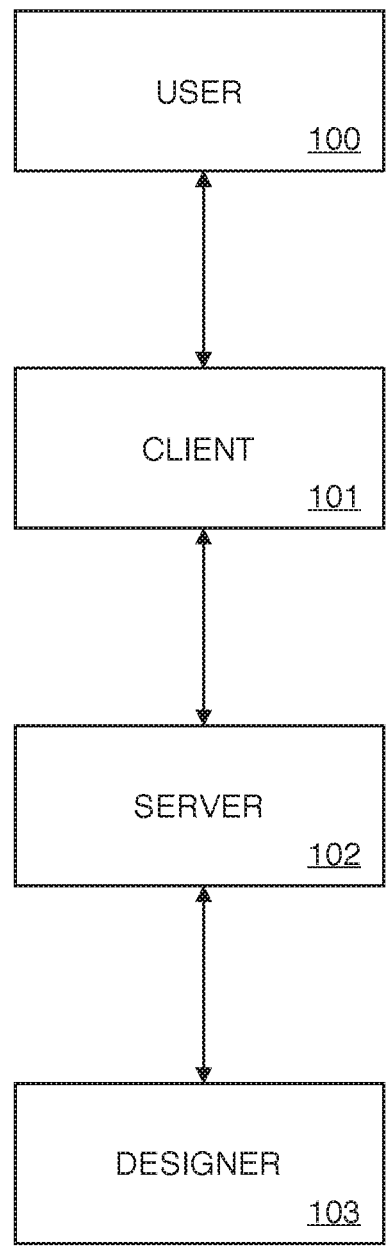
FIG. 1 is a block diagram showing the main components in an exemplary embodiment of the system.

The following detailed description refers to the accompanying drawings. Wherever possible, the same reference numbers are used in the drawings and the following description to refer to the same or similar elements. For clarity and simplicity, not all characteristics of practical embodiments are described in the specification. However, it is appreciated that many embodiment-specific decisions have to be made in developing the practical embodiments in order to achieve a particular object of the developer. While embodiments of the invention may be described, a person skilled in the relevant art would recognize that modifications, adaptations, and other implementations are possible without parting from the spirit and scope of the invention. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, proper scope of the invention is defined by the appended claims.

FIG. 1 depicts the components of an embodiment of the system. The user 100 is the human operator of the system for whom behavioral conditioning is sought. The client 101 is the component with which the user 100 interacts in order to receive conditioning. The client 101 is vended by and communicates with the server 102, according to the configuration provided by the designer 103.

Figure 2:
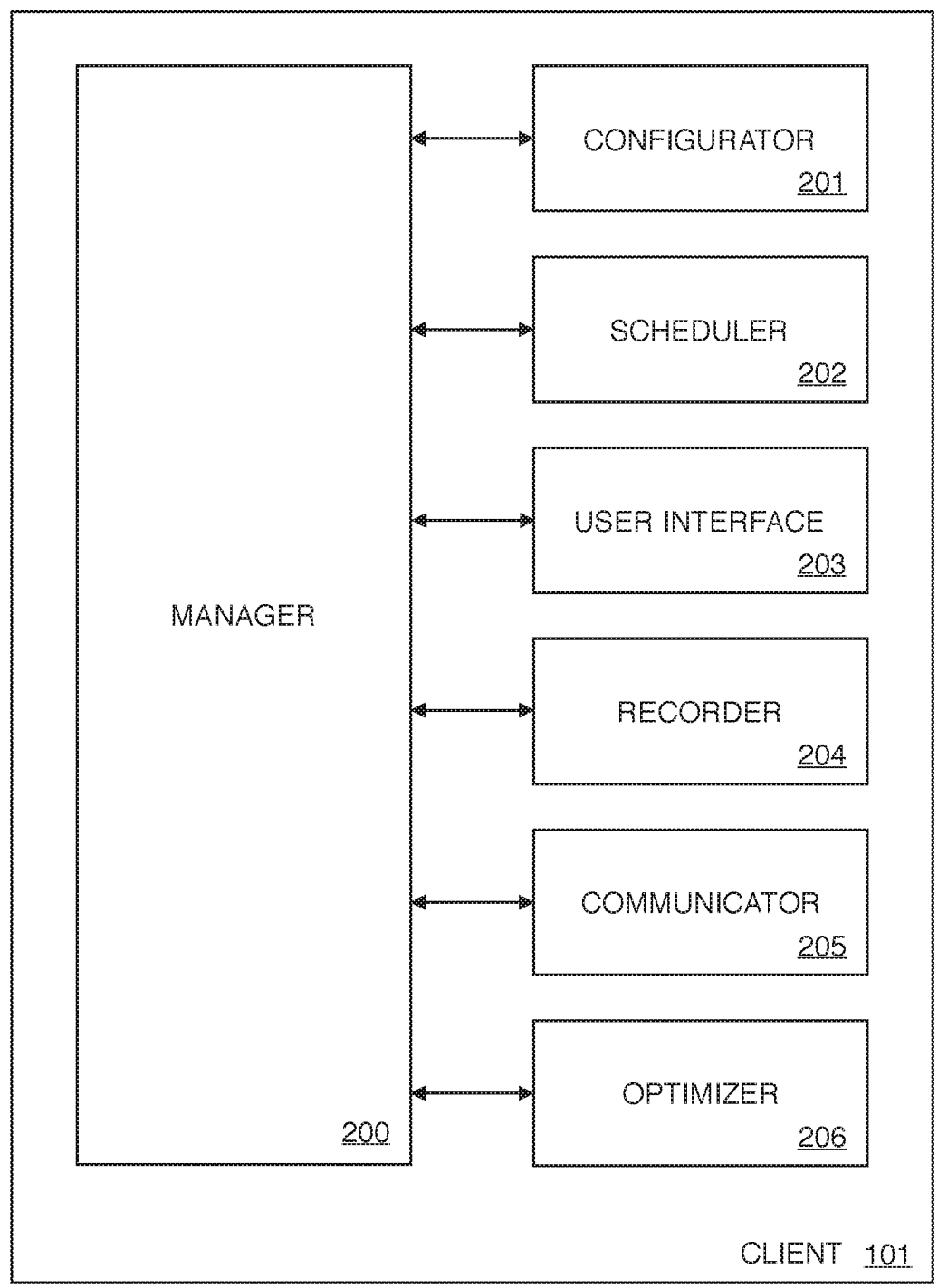
FIG. 2 is a block diagram showing the components of a typical client system.

FIG. 2 is a simplified block diagram illustrating representative components of the client 101 depicted in FIG. 1. The manager 200 is responsible for the execution, coordination, and interoperation of all other client 101 components. The configurator 201 sets the parameters used by several other components. The scheduler 202 controls the timing of criterion presentation. The user interface 203 provides the entire experience perceived by the user 100 and directly receives the user's actions. The recorder 204 stores information about the operation of the client 101. The communicator 205 provides the interface between the client 101 and server 102. The optimizer 206 adjusts the conditioning between conditioning sessions to improve the results.

Optimization generally implies a decision between impactful variables which may be discrete or continuous, the goal being to discover and select the variables most effective towards some given purpose. For an example, consider the goal of increasing aversion to a particular stimulus. Let's say the stimulus is a picture of a bottle, placed on some kind of approaching sprite (a computer graphic). We will measure success towards this goal by the percentage of the time that this sprite is avoided by the player. Optimization is possible by experimenting with different variable and then measuring the outcome, seeking correlations between the two. So, let's say in one session we play an unpleasant static-like noise for 3 seconds (setting A) if the player collides with the bottle, whereas in another session it only plays for a 1 second (setting B), with all other accessible variables being the same. Ignoring for the moment the possibility of confounders and their potential correction (e.g. is the longer or shorter noise session played first?), we would want to prefer, i.e. optimize using, the setting that results in a higher percentage of avoidance. So we try the next session with setting B, maybe further experimenting with 6 seconds (setting C) only to find diminishing returns or some negative side effect like increased probability of player stopping playing, thus finding a bit of a minimum and maximum as we narrow in the optimization.

Figure 3:
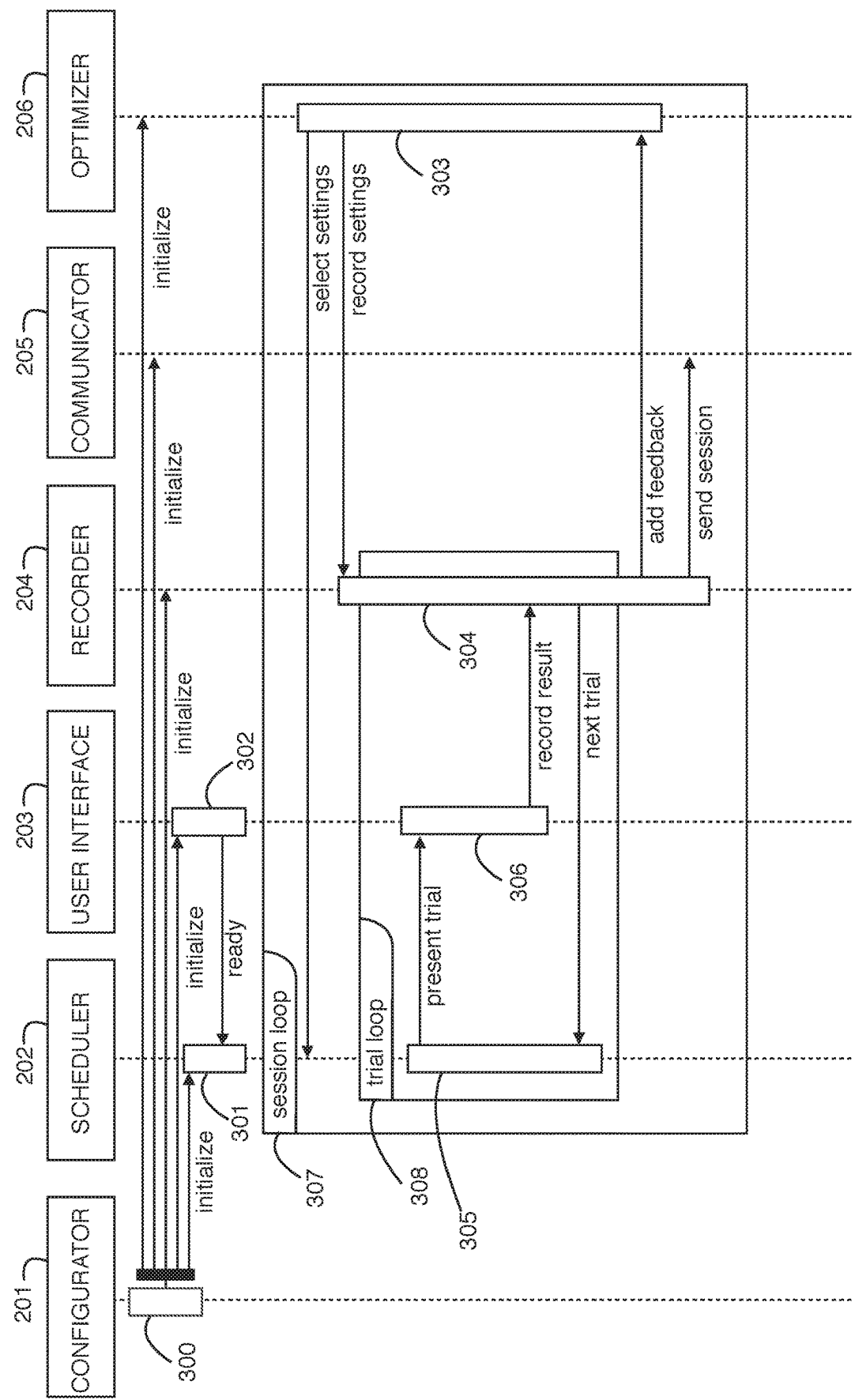
FIG. 3 is a sequence diagram illustrating a representative procedure of operation between and among client components.

FIG. 3 illustrates a sample sequence of operation among the components in the client 101. When the user 100 begins operation of the client 101, the configurator 201 initializes 300 the other operational components. The scheduler 202 then awaits 301 readiness 302 of the user interface 203. Following user interface 203 readiness 302, the session loop 307 begins. The optimizer 206 begins analyzing 303 the session and passes initial session settings to the scheduler 202, initiating the recorder's 204 recording 304 of the session and recording these session's settings. Each session may include a series of trials, illustrated as a trial loop.

The first trial loop 308 is then started and the scheduler initiates 305 the trial presentation 306 through the user interface 203. The trial begins with presentation of a predetermined conditioned stimulus at the user interface. When the presentation is completed and the user 100 has responded to the conditioned stimulus, the result is recorded by recorder 204. After the result is recorded, the next trial is begun, until all of the trials in the session are completed and corresponding results recorded at the recorder 304. Then the trials' metrics are fed back into the optimizer 206 for analysis and optimization of further sessions and the session information is transmitted by the communicator 205 to the server 102.

Figure 4:
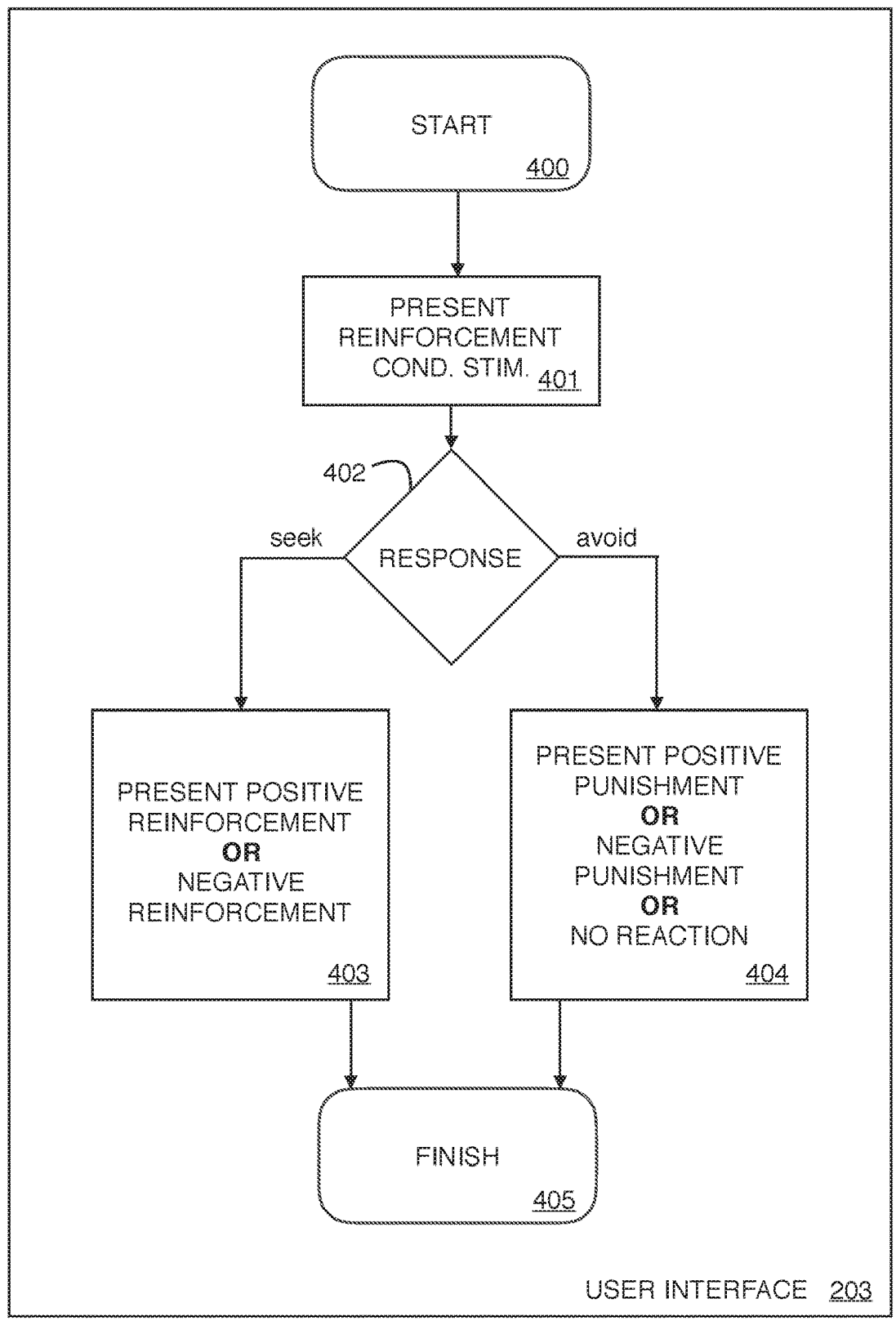
FIG. 4 is an example control flow diagram illustrating the flow of activity during a reinforcement condition stimulus trial.

FIG. 4 depicts the flow of activity in the user interface 203 when a trial with a reinforcement conditioned stimulus criterion is presented (306 in FIG. 3). The user interface starts 400 by presenting the reinforcement conditioned stimulus 401. The user's 100 response 402 is collected, and classified as either seeking or avoiding the conditioned stimulus. If the reinforcement conditioned stimulus is sought by the user 100, the user interface 203 presents 403 positive or negative reinforcement. Conversely, if the reinforcement conditioned stimulus is avoided, the user interface 203 presents 404 positive punishment, negative punishment, or no reaction. The trial presentation-response is then complete 405.

Figure 5:
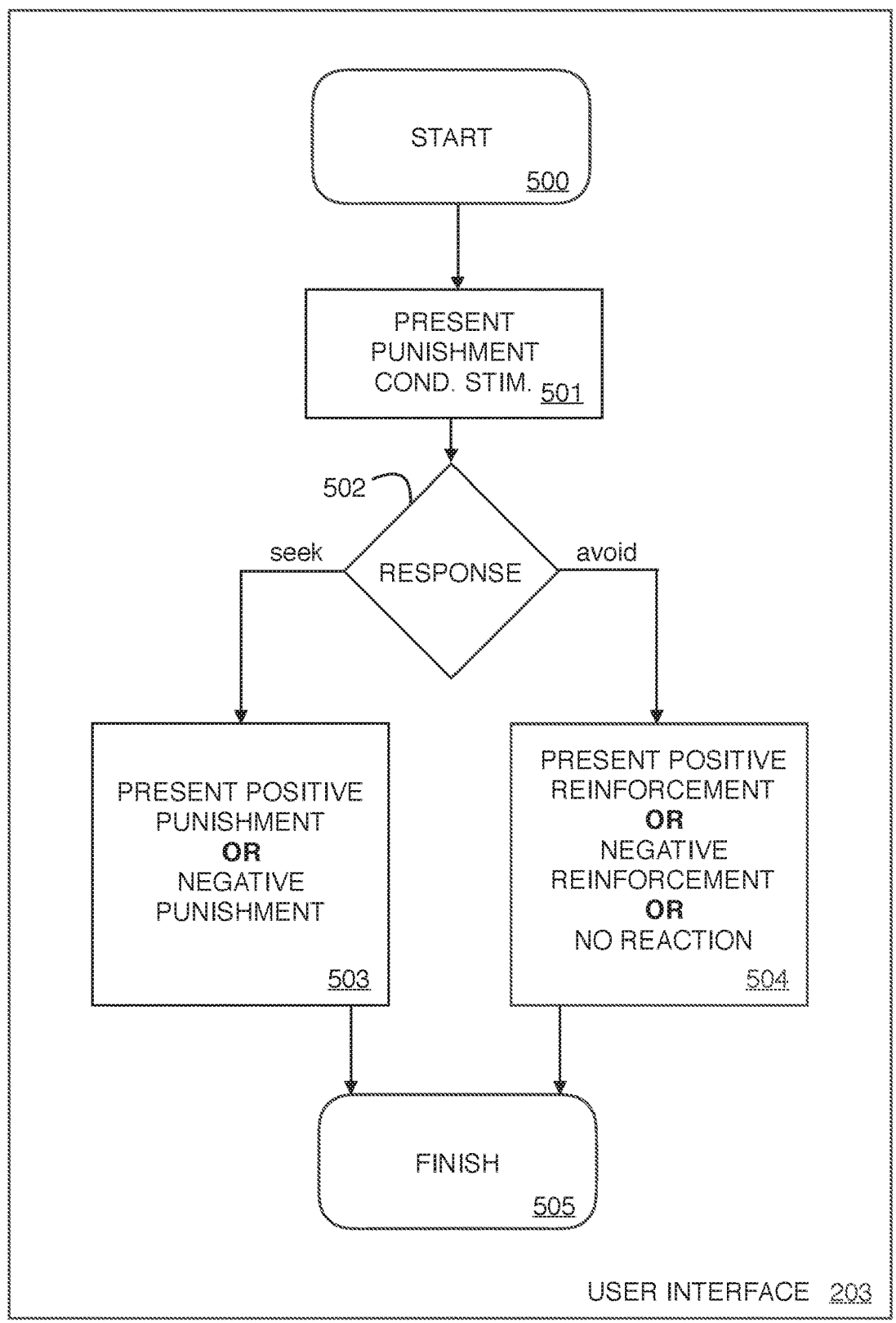
FIG. 5 is an example control flow diagram illustrating the flow of activity during a punishment condition stimulus trial.

FIG. 5 depicts the flow of activity in the user interface 203 when a trial with a punishment conditioned stimulus criterion is presented 306, acting as the complement to FIG. 4 in accordance with operant conditioned corollary. The user interface starts 500 by presenting the punishment conditioned stimulus 501. The user's 100 response 502 is then collected, classified as either seeking or avoiding the conditioned stimulus. If the punishment conditioned stimulus is sought by the user 100, the user interface 203 presents 503 positive or negative punishment. Conversely, if the punishment conditioned stimulus is avoided, the user interface 203 presents 504 positive reinforcement, negative reinforcement, or no reaction. The trial presentation-response is then complete 505.

Figure 6:
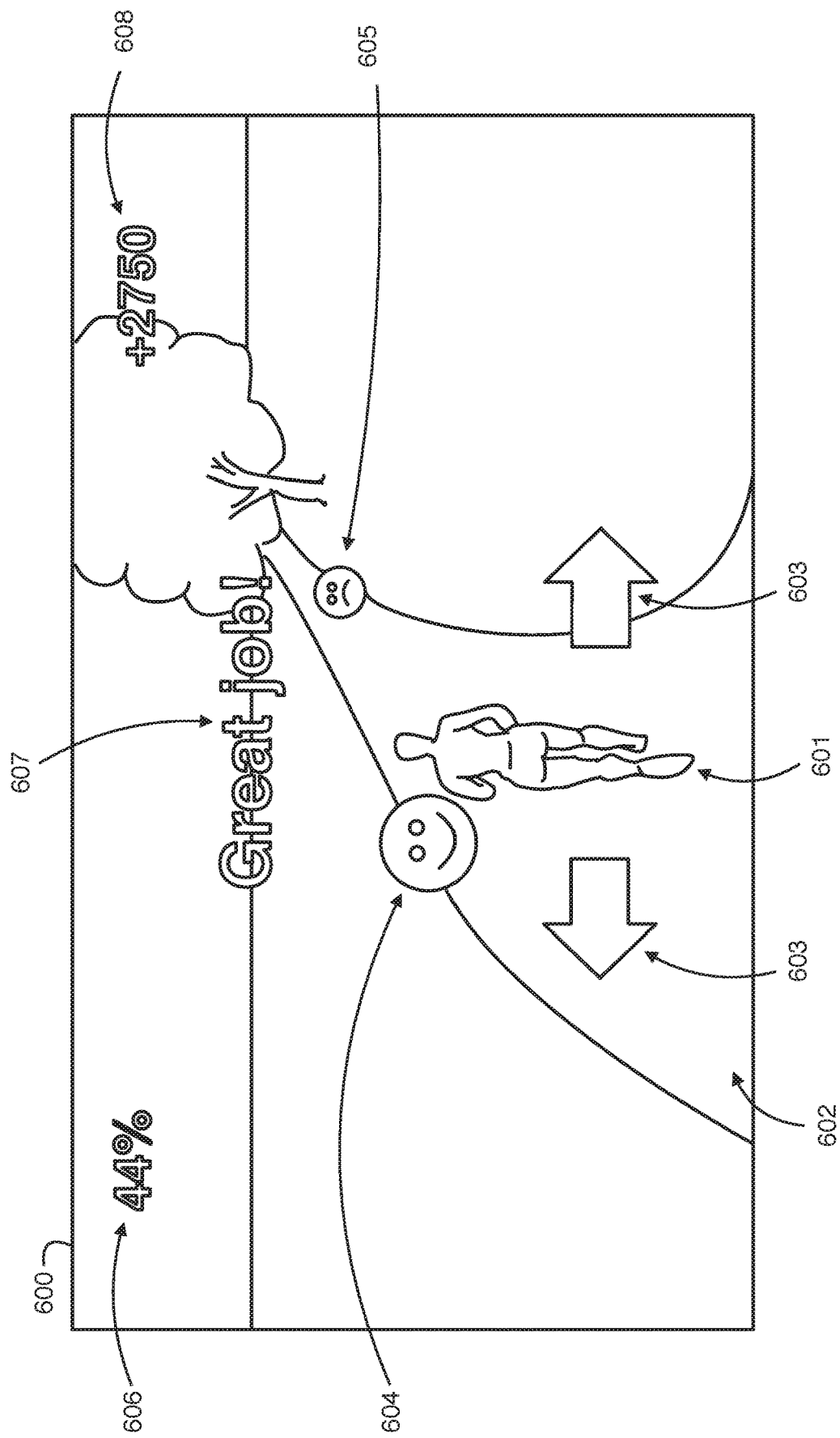
FIG. 6 illustrates a particular embodiment of the user interface.

FIG. 6 depicts an illustrative embodiment of a user interface 600 visual display. The display may be part of the user interface of a client system or device. This particular embodiment reflects a computerized three-dimensional projection visual rendering of a virtual game environment. The user 100 is represented by an avatar 601 which can move 603 to the left or right, under user control, as the game proceeds along a predetermined route 602. This movement allows the user 601 to either seek or avoid deconstructed reinforcement 604 or punishment unconditioned stimulus symbols 605. As described with regard to FIG. 4 and FIG. 5, the user's 100 behavior is then conditioned through the potential presentation of rewards and punishments through unconditioned stimuli. These conditioning reactions may be further augmented by indications of session completion 606, goal accumulation 608, and direct suggestion 607.

Figure 7:
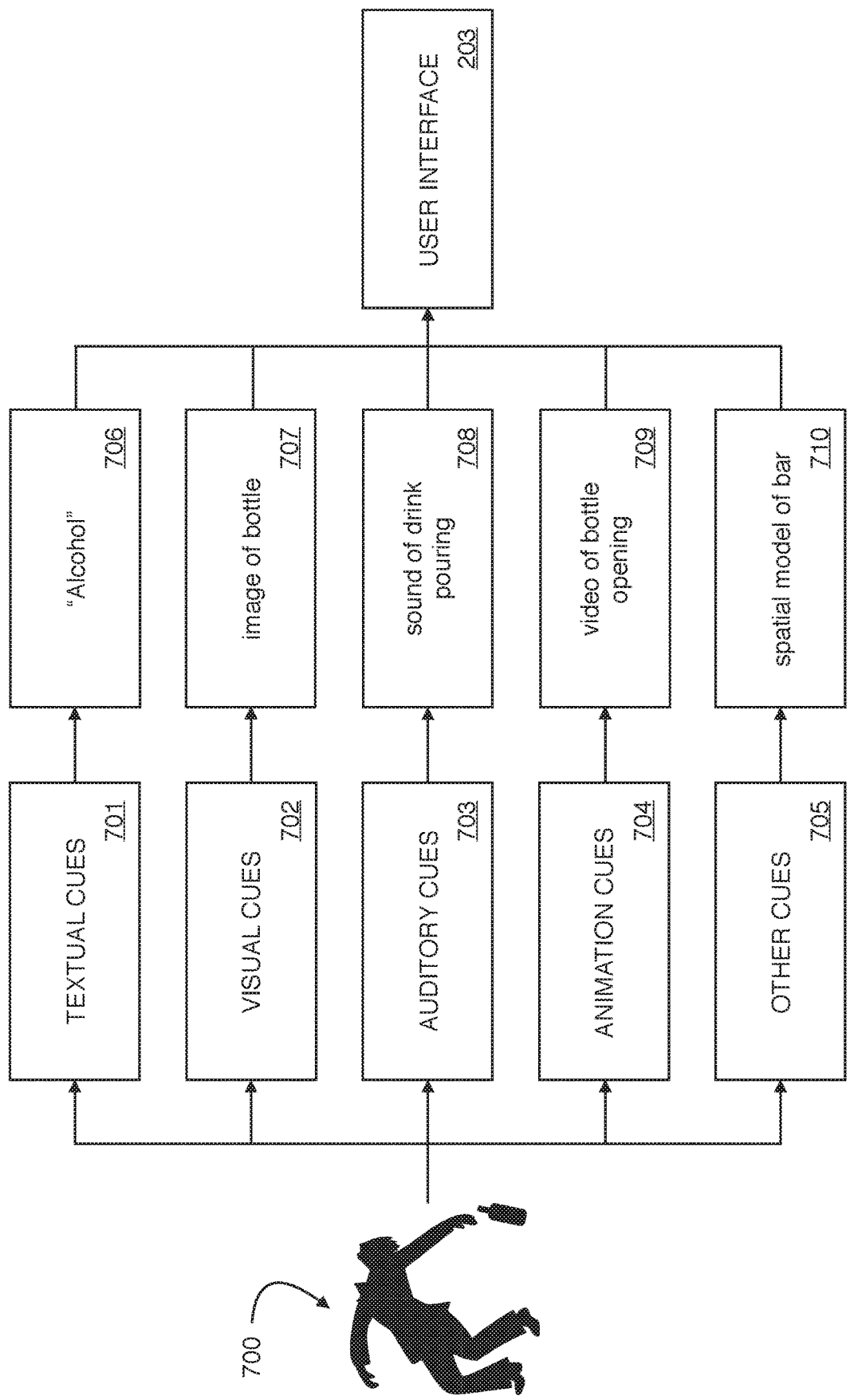
FIG. 7 is a block diagram illustrating the deconstruction of naturally associated aspects of real-life behavior and their development into user interface cues.

FIG. 7 illustrates an exemplary embodiment of the deconstruction of a user's 100 non-game behavior, i.e. real-life behavior, into cues suitable for inclusion in the system's user interface 203. Depending on the specific behavior and particular capabilities of a given embodiment, several different classifications of cues are considered, including textual 701, visual 702, auditory 703, and animation 704 cues. From the example behavior of alcoholic drinking 700 for aversion conditioning purposes, several cues are developed. The literal word, "Alcohol," 706 is developed from the textual cues 701; an image of a bottle of alcohol 707 is developed from the visual cues 702; the sound of an alcoholic drink pouring 708 is developed from the auditory cues 703; an animated video of an alcoholic bottle being opened 709 is developed from the animation cues 704; and a three dimension model of a bar serving alcohol 710 is developed from other cues 705, which may be spatial, temporal, temperature, smell, based on user 100 proximity, or any of a variety of other cues depending on the particular capabilities of a given embodiment. These developed cues may be used by the user interface 203 in the presentation of a conditioning trial 305.

Figure 8:
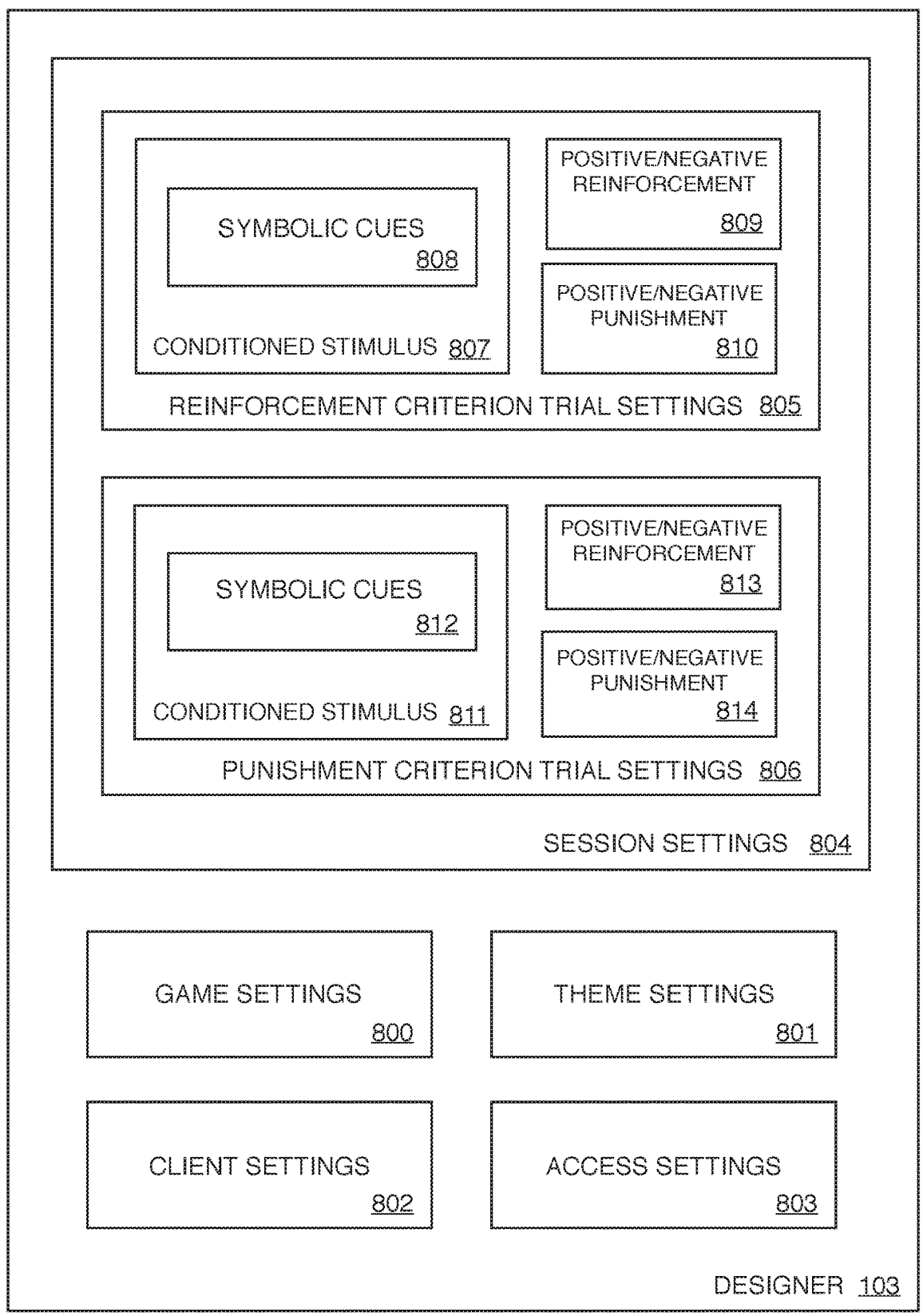
FIG. 8 is a block diagram showing an example of settings configured by a designer.

FIG. 8 depicts a representative set of settings available to the designer 103. The designer component 103 is used to configure the conditioning which the user 100 is to receive. These include the settings 800 of the game such as the name and initial instructions presented to the user 100; the settings 801 for the game's theme or style, e.g. "science fiction racing game") such that it may be made to appeal to particular population segment; the client settings 802 which define the particular type and configuration of clients 101 made available through the server 102; and the access settings 803 which define the rules by which the server 102 makes particular clients 101 available to particular users 100.

The designer 103 allows the specification of the settings 804 for a session type, such as optimizer 206 rules, and the definition of reinforcement criterion trial settings 805 and punishment criterion trial settings 806. The reinforcement criterion trial settings 805 include the developed symbolic cues 808 associated with a conditioned stimulus 807 and its positive and negative reinforcement(s) 809 and punishment(s) 810. Similarly, the punishment criterion trial settings 806 include the developed symbolic cues 812 associated with a conditioned stimulus 811 and its positive and negative reinforcement(s) 813 and punishment(s) 814.

The session settings may include any number of experimental parameters to be adjusted in order to optimize the conditioning outcome. These settings may include any perceptual differentiation from one session to another, including presence, order, randomization, prominence, and so on. Most frequently the session settings will include the timing of the conditioned stimulus relative to the unconditioned stimulus, including whether it follows or precedes it, any delay between the stimuli, and the duration of the stimuli as well as any rest period between trials. Session settings may further include strategies for optimization between sessions, such as Monte Carlo, evolutionary algorithms, simulated annealing, and so on, through incorporation of aggregate session data including over several users.

Trial settings, which may be directed by session optimization, may either be held constant through a session or may be varied. In the varying case, an example could be that the presence of a particular reinforcement condition occurs randomly in 20% of the trials, so this presence is thereby selected and recorded as a trial setting varying from one to another trial.

Figure 9:
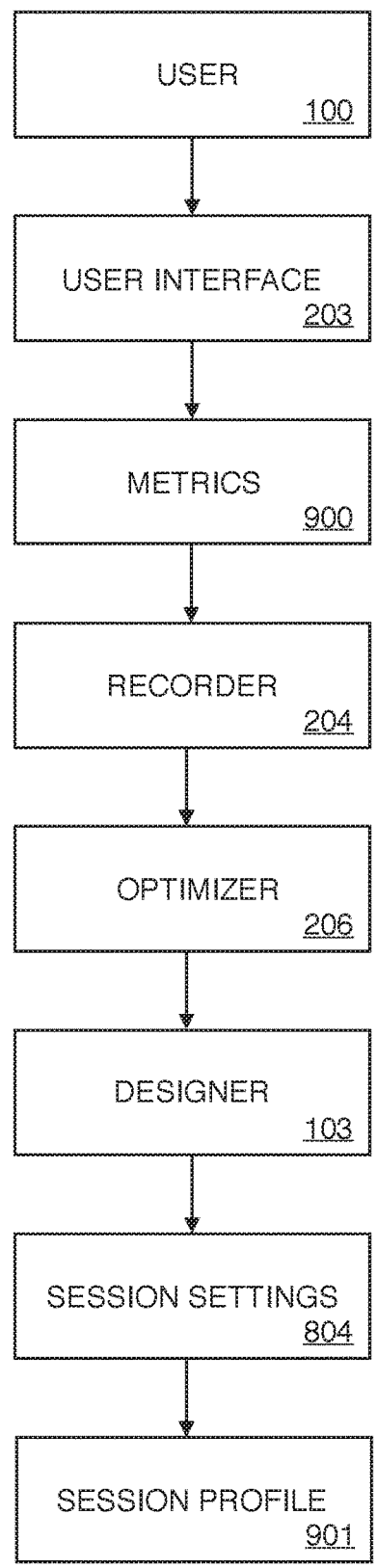
FIG. 9 is a block diagram showing an example flow of user metric data.

FIG. 9 depicts the flow of user metric data between components in the system. The user 100 interacts with the user interface 203 to produce use metrics 900 that are recorded by the recorder 204. These metrics are passed to the optimizer 206 and used in analysis and optimization 303. The metrics are further available through the server 102 to the designer 103 for production of a characteristic profile 901 of user's 100 session behavior for use in creating new session settings 804, particularly for the cloning of one user's 100 behavior by another.

Figure 10:
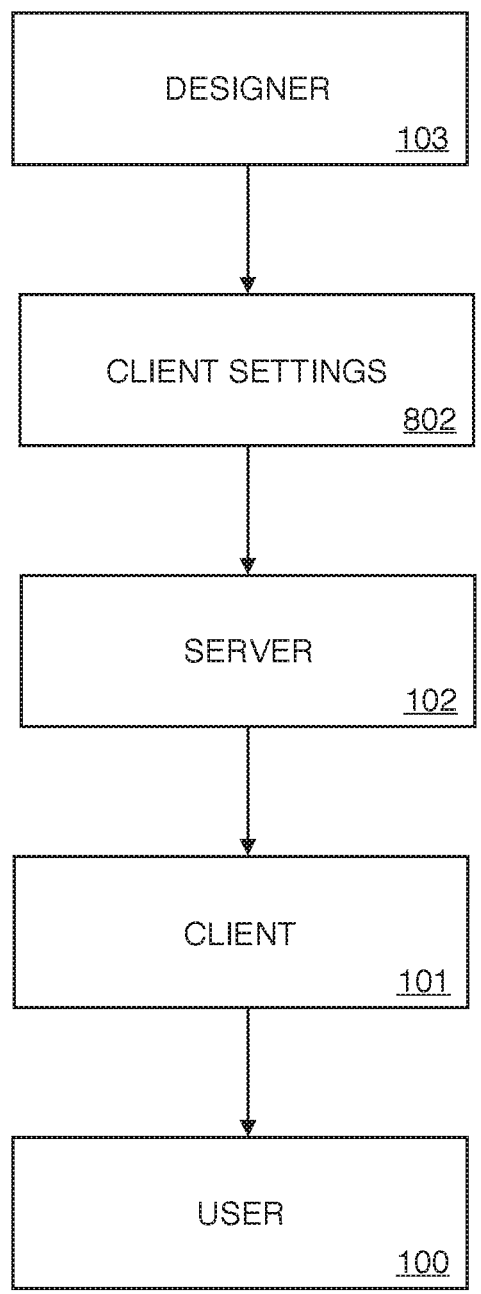
FIG. 10 is a simplified block diagram showing an example of production of clients.

FIG. 10 depicts the production of a client 101. The designer 103 uses the client settings 802 for the configuration of the server 102. These client settings 802 are used by the server 102 to produce client 101 instances which are then used for the game experience and attendant behavioral conditioning by the user 100. In order for the settings and optimization to be useful, it is preferred to monitor how the progress is going. Most essential is simply: is the user becoming more conditioned towards the desired behavior (or conversely, conditioned away from a discouraged behavior)? Essentially this can be measured as a response error rate, with the response time being a much fuzzier clue to their engagement. Other useful metrics may include: how long do they play? how frequently do they play? are they deviating from their typical play schedule? how much failure will they tolerate before improving or giving up? how quickly do the avoid aversive consequences and seek positive rewards before they actually occur? are there measurable pre-emptive actions, like avoiding a more "risky" game pathway? and so on.

Figure 11:
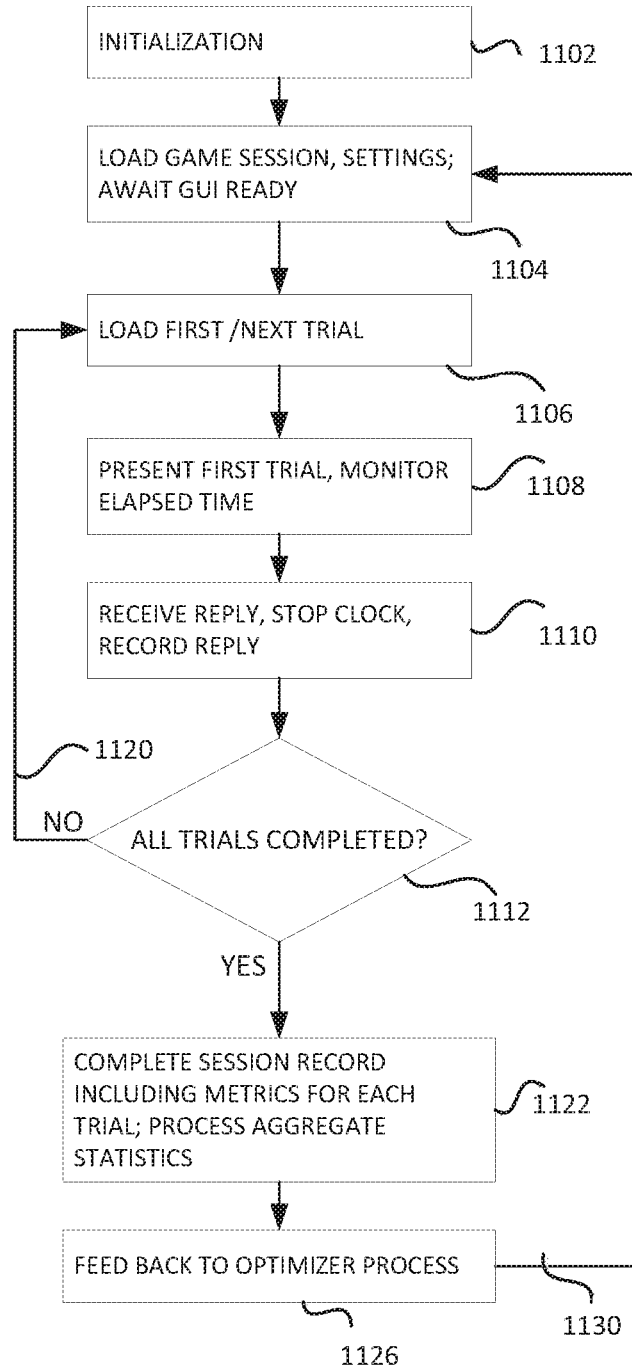
FIG. 11 is a simplified flow diagram of an example of a method for an executable electronic game for behavioral conditioning.

FIG. 11 is a simplified flow diagram of an example of a method for an executable electronic game for behavioral conditioning. The system is initialized at block 1102. Then the system loads a game session, including applicable settings, block 1104, and awaits a ready indication from the user interface. One example of session settings 804 are described above. Next the system loads a first trial, block 1106. The first trial is presented to the user interface, and the system commences tracking an elapsed time beginning at the time of presentation, block 1108. It may track the elapsed time, for example, by starting a clock or timer. Next the system awaits, then receives, a reply, i.e., an input at the user interface, presumably in response to the trial presentation, block 1110. The system captures the elapsed time and records the reply. In one example, a data unit recorded may be a triple comprising an identifier of the trial, elapsed (or response) time, and an indication of the reply. The reply may take any form that can be detected or received by the user interface. For example, it may be a touch screen tap or gesture, an audio sound, etc. The user interface may comprise various sensors, including but not limited to touch sensors, odor, photographic, visible light or UV, etc. These examples are not limiting.

After (or while) the reply is recorded, the system determines whether all trials of the current session have been presented, decision 1112. If not, the process loops via path 1120 to load the next trial, block 1106, and repeat the foregoing steps. Upon completion of all trials, the session metrics may be collected and stored for future analysis, block 1122. Such analysis may be automated, further described below, and/or it may be conducted manually by the system designer. The analysis may be used to optimize the system for a subsequent session. The analysis may be used to generate a report on the user's performance of the session. The collected metrics may be used for feedback to an optimizer software process, block 1126. Finally, the system may loop via 1130 back to load and conduct the next gaming session, block 1104.

Figure 12:
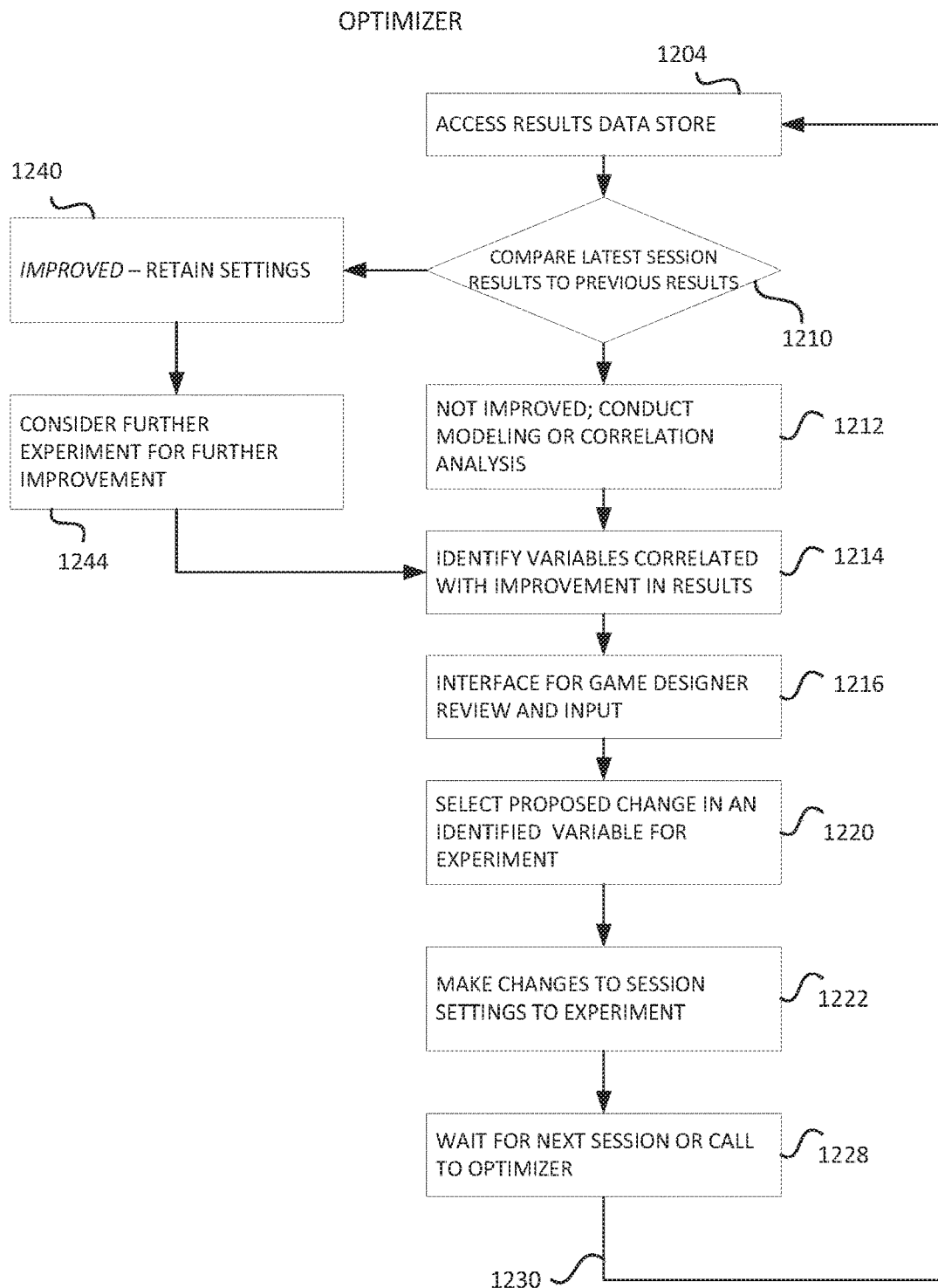
FIG. 12 is a simplified flow diagram of an example of an optimizer process in an electronic game for behavioral conditioning.

FIG. 12 is a simplified flow diagram of an example of an optimizer process in an electronic game for behavioral conditioning. At block 1204, the optimizer, which may be implemented in software, accesses a datastore of previous session metrics and statistics. The optimizer compares a last session results to the previous results. Results may comprise, for example, statistics describing response times over various trials in one or more previous sessions (with the same user). If the user performance improved (i.e., moved toward the reinforcement conditioned response more promptly or more often), the current session settings may be retained, block 1240. The session settings represent an improvement or optimization over prior sessions.

If the session settings are retained, the system or designer may next consider an experiment for further improvement, block 1244. Then the system proceeds to block 1214, described shortly.

Alternatively, if the last session was not an improvement, proceed to block 1212 and conduct modeling or correlation analysis of the previously stored results and metrics. This analysis may include the latest session. This analysis may cover metrics collected over many sessions. The goal is to identify settings or variables that are correlated with improvements in results, block 1214. The analysis may be applied to data collected for a single user. In some cases, a wider dataset may be used to advantage. For example, a large dataset may be used to determine best initial settings for a first session or starting point for a new user. Conditioning that was effective for many people is likely to be effective for the current user.

At block 1216, the designer may interact with the optimizer to explore the analysis, and based on the analysis choose variations or settings for a next session. In another embodiment, the optimization changes may be automated. Either way, proposed changes are selected for a next "experiment" to see if they improve the outcome, block 1220. The proposed changes are made to the session settings, block 1222, and finally, the optimizer may wait for a next session or call and return via path 1230.

It will be appreciated that many varied implementations may be used, for example, utilizing a wide variety of gaming environments, avatars, and stimuli. The stimuli may be merely graphics, or they may include other interactions with a user through light, sound, electrical signals, physical motions, actions, vibrations, etc. In general, any form of stimulus that can be generated or controlled programmatically and detected by a person or other may be implemented using the methods and systems described and illustrated.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A method comprising:
   providing a designer component arranged for configuring an executable electronic game, the designer component arranged to establish and store in a memory, game settings, client settings, theme settings and initial session settings for the game, the game settings including a name of the game and initial instructions for presentation to a user interface, the theme settings determining a theme or style of the game, the client settings defining a particular type and configuration of client instances of the game to be made available through a server, and the initial session settings including at least one reinforcement conditioned stimulus and at least one reinforcement associated with the conditioned stimulus, and at least one parameter to be adjusted in order to optimize a conditioning outcome of the session;
   initializing, by a processor, a session of the game to utilize a user interface of a client device, wherein the game session is directed to conditioning a non-game behavior of a user of the user interface, and initializing the game session includes loading from the memory the game settings, client settings, theme settings and the initial session settings for the game;
   in the processor, beginning a first or next trial in the game session by presenting the reinforcement conditioned stimulus of the first or next trial to the user interface according to the initial session settings, and starting a software clock or timer to determine an elapsed time beginning at the time of presentation;
   wherein the reinforcement conditioned stimulus presentation is integrated into a virtual game environment for interaction with the user via the user interface; and
   wherein the reinforcement conditioned stimulus is formed by:
      deconstructing the non-game behavior of the user to define at least one symbolic cue suitable for inclusion in the user interface; and
      incorporating the at least one symbolic cue into the presentation of the first or next trial;
   receiving a response input from the user interface;
   in the processor, recording the response input as user metric data in association with the first trial, the user metric data including the elapsed time beginning at the time of presentation until receiving the response input;
   in the processor, executing a binary classifier process based on the response input to obtain a result that classifies the response input as one of a seek response or an avoid response and adding the classification result to the user metric data;
   in the processor, based on the result classifying the input response as a seek response, presenting the reinforcement associated with the conditioned stimulus to the user interface in accordance with the stored initial session settings;
   conversely, in the processor, based on the result classifying the input response as an avoid response, presenting a selected one of a punishment or no reaction to the user interface, according to the stored initial session settings;
   in the processor, recording user metric data of the first trial in a machine-readable form, the user metric data including an identifier of the reinforcement conditioned stimulus and an indication of the response input;
   in the processor, repeating the foregoing steps of beginning a first or next trial, receiving a response input from the user interface, recording the response input, executing a binary classifier process; presenting a selected a reinforcement, punishment or no reaction to the user interface based on the classification of the input response, and recording user metric data to conduct additional trials in the game session according to the game settings until a termination condition is met;
   in the processor, responsive to the termination condition, terminating the game session;
   passing the recorded user metric data to an optimizer software component;
   in the optimizer component, comparing the recorded user metric data to stored results of previous game sessions to assess results of the behavior to be conditioned by the game;
   based on the assessment results showing improvement, retaining the initial session settings; and
   based on the assessment results showing no improvement, identifying a variable of the initial session settings correlated with improved results in the previous game settings; and updating the initial session settings by changing a value of the identified variable to improve the results of executing a next session of the game.

2. The method of claim 1 including, in the processor:
   gathering metrics of multiple game sessions;
   determining a measure of success for each game session;
   identifying from the gathered metrics a parameter of the game session settings that exhibits a positive correlation to the measure of success among the game sessions; and
   varying the identified parameter of the game session setting to improve the measure of success for a subsequent game session.

3. The method of claim 1 wherein the at least one symbolic cue includes at least one textual, visual, auditory, or animation cue.

4. The method of claim 1 wherein the at least one symbolic cue is based on another symbolic cue, wherein the another symbolic cue may be one or more of a spatial, temporal, temperature, smell, or user proximity cue.

5. A method for an executable electronic game for behavioral conditioning, the method comprising:
   initializing, by a processor, a user-interactive game session to utilize a user interface of a client device, wherein the game session is directed to modifying a behavior of a user of the user interface, and wherein the initializing step includes loading game session settings previously stored in a memory;
   by a processor, beginning a first trial in the game session by presenting a predetermined punishment conditioned stimulus of the first trial to the user interface;
   wherein the punishment conditioned stimulus presentation is integrated in a virtual game environment for interaction with the user; and
   wherein the punishment conditioned stimulus is formed by:
      selecting a user's non-game behavior as the behavior for conditioning in the game session;

deconstructing the selected non-game behavior of the user to define at least one symbolic cue suitable for inclusion in the user interface; and incorporating the at least one symbolic cue into the presentation of the first trial;

receiving a response input from the user interface;

recording the response input in association with the first trial;

in the processor, executing a binary classifier process based on the response input to obtain a result that classifies the response input as one of a seek response or an avoid response;

based on the result classifying the input response as a seek response, presenting a punishment to the user interface;

conversely, based on the result classifying the input response as an avoid response, presenting a selected one of a reinforcement or no reaction to the user interface;

recording metrics of the first trial in a machine-readable form, the metrics including an identifier of the reinforcement conditioned stimulus and an indication of the response input;

repeating the foregoing steps to conduct additional trials in the game session until a termination condition is met; and responsive to the termination condition, terminating the game session;

and further comprising, collecting the recorded metrics for the game session and, in an optimization process, analyzing the metrics, and varying the game session settings for a second game session based on the analysis, wherein the optimization process includes— gathering metrics of multiple game sessions;

determining a measure of success for each of the multiple game sessions;

identifying from the gathered metrics a parameter of the game session settings that exhibits a positive correlation to the measure of success among the game sessions; and varying the identified parameter of the game session settings to improve the measure of success for a subsequent game session.

6. The method of claim 5 wherein the recorded metrics include a response time of the response input measured from the said presenting the punishment conditioned stimulus.

7. The method of claim 5 wherein the cues include at least one of the classifications of textual, visual, auditory, and animation cues.

8. The method of claim 5 wherein the at least one symbolic cue is based on at least one other cue which may be spatial, temporal, temperature, smell, or based on user proximity, or a combination of these other cues.

9. A manufacture comprising a non-volatile, machine-readable memory device storing a series of executable instructions so that a suitable machine or processor, with appropriate access to the memory device, can execute the instructions to carry out a process implemented by the instructions; the process including the steps of:

initializing a user-interactive game session to utilize a user interface of a client device, wherein the game session is directed to modifying a behavior of a user of the user interface;

wherein initializing the game session includes loading a session setting, the session setting including a reinforcement criteria trial setting, wherein the reinforcement criteria trial setting includes a reinforcement conditioned stimulus, and a reinforcement;

beginning a first trial in the game session by presenting the reinforcement conditioned stimulus to the user interface;

receiving a response input from the user interface;

recording the response input in association with the first trial;

classifying the response input as one of a seek response or an avoid response;

based on classifying the input response as a seek response, presenting the reinforcement to the user interface;

conversely, based on classifying the input response as an avoid response, presenting a selected one of a punishment or no reaction to the user interface;

recording metrics of the first trial in a machine-readable form, the metrics including an identifier of the reinforcement conditioned stimulus and an indication of the response input;

repeating the foregoing steps of presenting the reinforcement conditioned stimulus, receiving a response, recording the response, classifying the response, presenting the reinforcement or presenting a selected one of a punishment or no reaction to the user interface based on the classification of the input response, and recording metrics so as to conduct additional trials in the game session and to record additional metrics of the additional trials until a termination condition is met; and responsive to the termination condition, terminating the game session;

wherein the process implemented by the instructions further includes collecting the recorded metrics for the game session, analyzing the collected metrics in an optimizer software process of the stored instructions, and varying the session settings for a second game session based on the analysis; and wherein the optimizer process implements the steps of:

determining results of the game session based on the analysis of the collected metrics;

comparing the determined results to previous results;

if the determined results do not indicate improvement over the previous results, conducting an analysis of the previous results to identify at least one variable correlated with improvement in results;

presenting the identified at least one variable in a game designer interface;

receiving from the game designer interface a selection of at least one of the identified at least one variable; and modifying the session setting for a next game session by changing the selected at least one variable.

10. The manufacture of claim 9 wherein the optimizer process includes analyzing the results from multiple previous sessions with the same user.

11. The manufacture of claim 9 wherein the optimizer process includes analyzing the results from multiple sessions over multiple different users.

* * * * *